June 15, 1937.　　　　　F. E. KEY　　　　　2,084,145
TUBE
Filed May 24, 1935
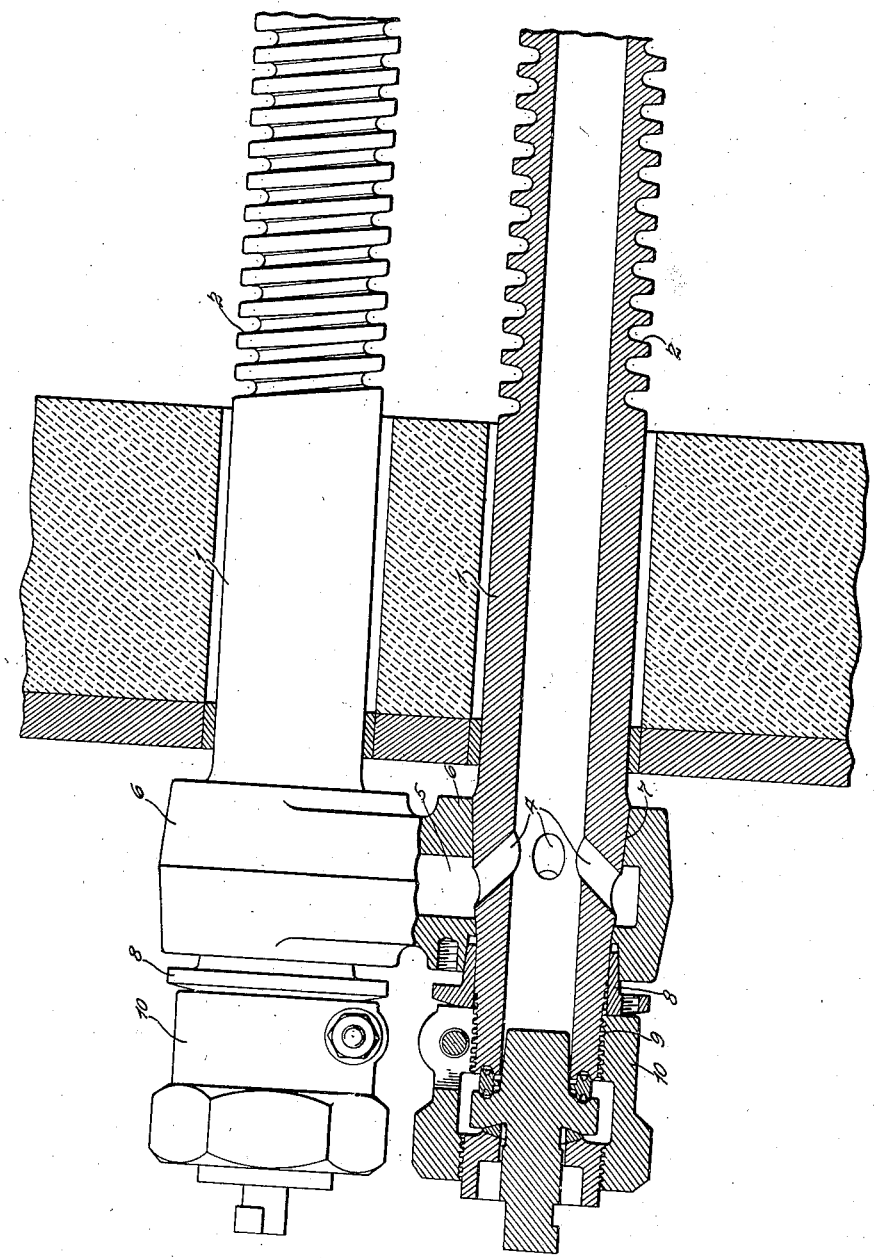
Inventor
Frederick E. Key
by Rippey & Cassidy
His Attorneys.

Patented June 15, 1937

2,084,145

UNITED STATES PATENT OFFICE 2,084,145

TUBE

Frederick E. Key, St. Louis, Mo., assignor to Key Company, East St. Louis, Ill., a corporation of Missouri Application May 24, 1935, Serial No. 23,157

3 Claims. (Cl. 138—70)

This invention relates to tubes adapted for high temperatures and pressures.

In work requiring high internal pressures, in the neighborhood of 5000 lbs. per square inch, and high temperatures, 1500° F. within the tubes and 3000° F. in the furnace, special alloy steels must be used. High content nickel-chrome steel, on account of its high tensile strength and heat resisting properties, has been suggested for such use. An analysis of such a steel, known as "18-8 stainless steel", is as follows:

| | Percent |
|---|---|
| Carbon | under .15 |
| Manganese | do .50 |
| Phosphorus | do .025 |
| Sulphur | do .025 |
| Silicon | do .75 |
| Chromium | 17.50–19.50 |
| Nickel | 8.00–10.00 |

Difficulties arise, however, in the use of such a metal under those conditions of temperature and pressure due to their low thermal conductivity although their high creep strength at elevated temperatures otherwise indicates their use. Desirable characteristics of alloy steel, including high tensile strength at high temperatures, heat resisting properties, and high creep strength are obtained by the addition of non-ferrous metals such as chromium which considerably decrease the coefficient of thermal conductivity. The specific steel mentioned has a thermal conductivity only 36 per cent. that of pure iron and which, of course, is substantially below that of carbon steel. As a result of the low thermal conductivity and because of the thickness of the walls of tubes to carry the extreme pressures, they are liable to scale and chip and thus are soon rendered useless. "Creep strength" here referred to is the tendency to oppose permanent elongation, especially at high temperatures under pressures but where those pressures are less than the tensile strength of the metal.

An object of this invention is to provide a tube adapted for high temperatures and pressures, having relatively low thermal conductivity and relatively high creep strength at elevated temperatures, which has means to enhance heat transfusion and thus reduce the differential in temperature between outside and inside portions of the tube.

Another object of the invention is to provide a tube of the character suitable for high pressures and temperatures having suitable means near its ends for communication with headers or connecting members.

Other objects will be apparent from the following detail description, taken with the accompanying drawing.

The drawing illustrates, partly in section, a pair of tubes embodying my invention, with a connecting member.

Tubes 1 are constructed of an alloy steel and adapted to withstand high temperatures and high pressures. They have relatively thick walls and have a helix 2 cut in their periphery intermediate their ends between the points at which they pass through a tube sheet 3. Lateral openings or ports 4 are cut through the wall of the tube near the end to communicate with a channel 5 in a connecting member 6. The end of the tube is cut or formed to provide a conical seat 7 for the connecting member 6 and a cylindrical seat 7a for a sealing ring 8. The outer ends of the tubes have screw threads 9 to receive a nut 10, by which the sealing ring 8 is pressed in place and the connecting member 6 is held on its seat.

The structure of the connector is illustrated and described in detail and is claimed in my application Serial No. 11,276, filed March 15, 1935.

A nickel-chrome steel of the composition detailed above and including approximately 18% chromium and 8% nickel is recommended, although this invention is not limited to any specific alloy. It is of particular utility where a metal having relatively low thermal conductivity and relatively high creep strength at elevated temperatures is used. When "relative" is used herein, carbon steel is taken as a standard of comparison.

No particular style is recommended for the threads 2, a pitch between ½" and 1" is preferred.

The invention is particularly applicable and economical for tubes intended to carry a pressure of at least 2000 pounds per square inch with an internal temperature of at least 1200° F.

Such tubes must in any event have thick walls which are not appreciably weakened by the helix 2, or the ports 4 and these provide sufficient metal for the formation of the seat 7 and the threads 9. At the same time the helix in fact thins the walls to speed heat transfusion from the combustion heat in the furnace to the fluid in the tubes, thus reducing the differential in temperature between the outer and the inner surfaces of the tubes.

The exact form of the recess 2 is not necessarily a helix although a form of recess or recesses non-circular in shape is preferred, because it provides a continuous or connected strip of metal the full thickness of the original of the tube throughout its length.

Various changes may be made in the details of construction, within the scope of the appended claims, and parts of the invention may be used without the whole.

I claim:

1. A tube having relatively thick walls adapted for use with internal pressures of 2000 pounds or more per square inch at a temperature of 1200° F. or more constructed of an alloy steel containing one or more non-ferrous metals sufficient to reduce its heat conductivity substantially below that of carbon steel, and having a helical recess of substantial depth about its periphery at a section intermediate and terminating inwardly from its ends intended for exposure in a furnace.

2. A tube having relatively thick walls adapted for use with internal pressures of 2000 pounds or more per square inch at a temperature of 1200° F. or more constructed of an alloy steel containing one or more non-ferrous metals sufficient to reduce its heat conductivity substantially below that of carbon steel, and having approximately one-half its periphery recessed to a substantial depth at a section intermediate and terminating inwardly from its ends intended for exposure in a furnace.

3. A tube having relatively thick walls adapted for use with internal pressures of 2000 pounds or more per square inch at a temperature of 1200° F. or more constructed of an alloy steel containing one or more non-ferrous metals sufficient to reduce its heat conductivity substantially below that of carbon steel, and having its periphery recessed non-circular in form of a substantial depth at a section intermediate and terminating inwardly from its ends intended for exposure in a furnace.

FREDERICK E. KEY.